United States Patent [19]

Henderson et al.

[11] Patent Number: 4,671,380

[45] Date of Patent: Jun. 9, 1987

[54] HYDRAULIC NOISE ATTENUATORS

[75] Inventors: Andrew R. Henderson; Richard J. Whitson, both of Glasgow, Scotland

[73] Assignee: American Olaer, Inc., New York, N.Y.

[21] Appl. No.: 838,667

[22] Filed: Mar. 12, 1986

[30] Foreign Application Priority Data

Mar. 15, 1985 [GB] United Kingdom ................. 8506836

[51] Int. Cl.⁴ ............................................. F01N 1/10
[52] U.S. Cl. ..................... 181/233; 181/249; 181/252; 138/30
[58] Field of Search ....................... 181/233, 252, 249; 138/30

[56] References Cited

U.S. PATENT DOCUMENTS

| | | | |
|---|---|---|---|
| 1,494,066 | 5/1924 | Pasche-Huguenin | 181/233 X |
| 2,194,163 | 3/1940 | Dahl | 181/233 |
| 2,875,787 | 3/1959 | Evans | 138/30 |
| 3,605,815 | 9/1971 | Forell | 138/30 |
| 4,356,886 | 11/1982 | Daude et al. | 181/252 X |

*Primary Examiner*—Benjamin R. Fuller
*Attorney, Agent, or Firm*—Arthur B. Colvin

[57] ABSTRACT

A hydraulic noise attenuator of the type utilizing a tubular casing having an inlet and outlet end, a perforated tube extending through the casing, the ends of the tube being secured in the inlet and outlet ends of the casing, portions of the tube adjacent at least the secured outlet end thereof, being encompassed by sound-absorbing material means being provided to reflect sound waves against the sound-absorbing material to enhance the attenuation at the lower frequencies.

5 Claims, 1 Drawing Figure

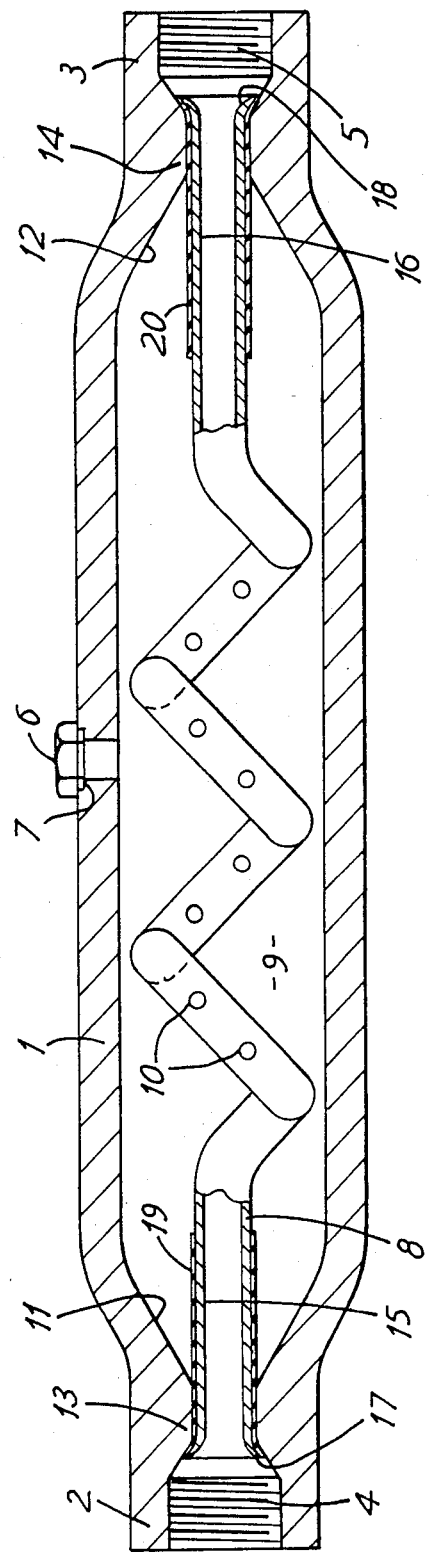

HYDRAULIC NOISE ATTENUATORS

This invention relates to hydraulic noise attenuators for attenuating noise in hydraulic pipelines, generated for example by the pulsating delivery of positive displacement pumps.

Hydraulic attenuators are known which comprise an outer pressure-resistant casing filled with hydraulic liquid and having an inlet and an outlet at opposite ends and a flow path defined in the interior of a tube extending from the inlet to the outlet and formed with holes providing pressure balance between the interior of the tube and the remainder of the interior of the casing. Such an attenuator reflects the compression waves in the hydraulic liquid flow entering through the inlet with phase changes and thereby attenuates the training waves. The required performance of the attenuator may be optimized in known manner by appropriate choice of the relative diameters and lengths of the casing and tube and the number, size and distribution of the holes in the tube. The tube may extend straight between the inlet and outlet, or may be of increased length and convoluted.

An attenuator according to the invention is characterized by an end construction, preferably at each end, which includes a surface to reflect sound waves, the tube extending through the casing having at least the portion thereof adjacent the reflecting surface covered by a layer of sound-absorbing material.

With such a construction, compression waves travelling longitudinally in the casing towards the said end construction will be reflected onto the sound-absorbing material, with the result that noise will be further attenuated. The compliance of the sound-absorbing material will reduce the effective bulk modulus of the chamber and for, a given size of chamber, improve the low frequency performance of the attenuator. This enables a less bulky attenuator to be used for a given performance.

The sound-absorbing material may be in the form of a tube of rubber or rubber-like material compatible with the hydraulic liquid, for example nitrile rubber or neoprene.

The invention will now be further described by way of example, with reference to the accompanying drawing in which the single FIGURE is a longitudinal sectional view of a noise attenuator.

The noise attenuator shown in the drawing comprises an outer, thick-walled tubular casing 1 having reduced diameter ends 2 and 3 which are internally screw threaded at 4 and 5 respectively to form an inlet and an outlet for connection in a pipeline of a hydraulic installation. A screw threaded plug 6 and seal 7 close a port in the side wall of the casing 1 through which all air may be expelled from the casing during priming of the installation.

Interconnecting the inlet 4 and outlet 5 is a tube 8 of internal diameter close to but usually different from the internal diameter of the connected pipework. The tube 8 may be either straight or, as shown in the drawing, be convoluted, in this case into a helix. The interior of the tube 8 communicates with the remainder of the space 9 within the casing 1 through a series of holes 10 which difuse noise transmitted into the tube 8 from the inlet 4 into the space 9. Since the holes 10 balance the mean pressure inside and outside the tube 8, the latter can have a relatively thin wall.

At each end of the casing a surface is provided to reflect sound waves. In the illustrative embodiment shown, such reflecting surfaces are defined by frusto-conical configuration 11,12 on the inner wall at each end of the casing, which configurations flare down to a respective construction 13 and 14.

The ends 15 and 16 of the tube 8 extend through the respective constrictions 13 and 14 and are swaged outwards at 17 and 18. Each tube end 15 and 16 is covered by a rubber tube 19,20 which extends outwards through the respective constriction 13,14 to form a seal between the tube ends 15 and 16 and the respective constrictions 13 and 14.

The length of the tubes 19 and 20 can be varied in accordance with the required performance of the attenuator.

When a straight tube 8 is used, the casing 1 and its ends 2 and 3 may be completely preformed in one piece. Where, however, a greater length is required for the tube 8, necessitating a convoluted conformation, the outer casing may be made in two parts which are subsequently secured together either by welding or a bolted flanged connection, or one end, for example the end 2, may be preformed and the tube 8 inserted from the other end with its tube end 15 projecting through the inlet 4, and the other end 3 of the outer casing 1 can be hot-formed, the tube 8 moved to its final position, the rubber tubular sleeves 19 and 20 positioned on the tube ends which are then swaged at 17 and 18.

Having thus described the invention and illustrated its use, what is claimed as new and is desired to be secured by Letters Patent in the United States is:

1. A hydraulic noise attenuator comprising an outer pressure-resistant casing having an inlet and an outlet at opposite ends, a tube extending within the casing between the inlet and the outlet of the casing and defining a flow path for hydraulic liquid, said tube including a central portion formed with holes communicating the interior of said tube with said casing and an imperforate portion adjacent one end of said tube, said imperforate portion of said tube being covered by a layer of sound-absorbing material terminating short of said central portion, and sound-reflecting surface means in said casing surrounding said one end of said tube, said surface means being positioned to reflect sound onto said layer.

2. An attenuator in accordance with claim 1 wherein the other end of said tube includes a second imperforate portion leading to said central portion, said second imperforate portion being covered with a second layer of sound-absorbing material terminating short of said central portion, and a second sound-reflective surface means in said casing surrounding said other end of said tube, said second sound-reflecting means being positioned to reflect sound onto said second layer.

3. An attenuator according to claim 1, wherein the sound-absorbing material is elastomeric.

4. An attenuator according to claim 1, wherein said reflecting surface means comprises an inner wall surface of an end portion of said casing, said end portion of said casing flowing down to meet said tube in sealed connection therewith.

5. An attenuator according to claim 4, wherein said inner wall surface of the casing where it flares down to the tube is frusto-conical.

* * * * *